United States Patent
Maurer

(10) Patent No.: US 7,801,386 B2
(45) Date of Patent: Sep. 21, 2010

(54) METHOD FOR BILATERAL FILTERING OF DIGITAL IMAGES

(75) Inventor: Ron Maurer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/021,979

(22) Filed: Jan. 29, 2008

(65) Prior Publication Data

US 2008/0118173 A1 May 22, 2008

Related U.S. Application Data

(63) Continuation of application No. 10/631,148, filed on Jul. 31, 2003, now Pat. No. 7,352,911.

(51) Int. Cl.
G06K 9/40 (2006.01)
G06K 1/00 (2006.01)
H04N 5/00 (2006.01)
H04N 1/60 (2006.01)
H04N 1/40 (2006.01)
H04N 1/38 (2006.01)
G06F 15/00 (2006.01)

(52) U.S. Cl. .................. 382/254; 382/260; 382/274; 382/275; 348/606; 358/1.9; 358/447; 358/461; 358/463

(58) Field of Classification Search ............ 382/254, 382/260, 274, 275; 348/606–624; 358/1.9–3.31, 358/447, 461, 463
See application file for complete search history.

(56) References Cited

U.S. PATENT DOCUMENTS

| 4,152,766 A | 5/1979 | Osofsky et al. |
| 5,710,875 A | 1/1998 | Harashima et al. |
| 7,146,059 B1 * | 12/2006 | Durand et al. ............ 382/260 |
| 7,269,295 B2 | 9/2007 | Keshet et al. |
| 2003/0156762 A1 | 8/2003 | August |
| 2005/0025379 A1 | 2/2005 | Keshet et al. |

OTHER PUBLICATIONS

Elad, "On the Origin of the Bilateral Filter and Ways to Improve It", Oct. 2002, IEEE Transactions on Image Processing, No. 10, pp. 1141-1151.*
Tomasi, C. et al., "Bilateral Filtering for Gray and Color Images," Proc. IEEE Intlt. Conf. on Computer Vision, Bombay, India, 1998.
Taylor Series, http://en.wikipedia.org/wiki/Taylor_series. (cited by Examiner in parent U.S. Appl. No. 10/631,148).
Taylor Series, http://mathworld.wolfram.com/Taylor_series. (cited by Examiner in parent U.S. Appl. No. 10/631,148).
Power Series, http://en.wikipedia.org/wiki/Power_series. (cited by Examiner in parent U.S. Appl. No. 10/631,148).
Verron, "The Taylor series for Bandlimited Signals," J. Austral Math Soc, Ser B 36 (1994), pp. 101-106. (cited by Examiner in parent U.S. Appl. No. 10/631,148—not provided herewith).

* cited by examiner

Primary Examiner—Anand Bhatnagar
Assistant Examiner—Randolph Chu

(57) ABSTRACT

A method for processing an image using a bilateral filter. The bilateral filter is reformulated at each pixel location in the image into a sum of the original signal value of a central pixel at said pixel location and a bilateral correction term which is a function of local signal differences between the central pixel and its neighbors. The bilateral correction term is calculated using a computationally efficient approximation.

20 Claims, 3 Drawing Sheets

METHOD FOR BILATERAL FILTERING OF DIGITAL IMAGES

CROSS-REFERENCE TO RELATED APPLICATIONS

This application is a continuation application of U.S. patent application Ser. No. 10/631,148, filed Jul. 31, 2003 now U.S. Pat. No. 7,352,911, the disclosure of which is incorporated herein by reference.

BACKGROUND

The bilateral filter is a non-linear filter introduced by Tomasi and Manduchi (see "Bilateral filtering for gray and color images," Proc. IEE Intl. Conf. on Computer Vision, Bombay, India, 1998), which is used for selective denoising of images without blurring image edges. The bilateral filter is based on the idea of modifying the weights of a convolution mask in an image dependent manner, as a function of intensity differences between a pixel under consideration and its neighbors. While the original convolution weights sum to one (as required from any mean-preserving filter), the sum of the modified weights is less than one, so that in order to retain the local normalization of the modified convolution weights, the convolution result is divided by the sum of the modified weights. This single division operation considerably increases the computational complexity necessary to implement a bilateral filter with a digital processor. In addition, in hardware implementations it forces the inclusion of an integer division circuit which would be otherwise unnecessary.

In implementing a bilateral filter, the DIVIDE operation has a large relative cost in actual computation time. As a typical example, one benchmark program shows that on a Pentium-III processor, integer ADD or SUBTRACT operations take a single clock cycle, while an integer MULTIPLY takes 5 cycles, a lookup-table operation takes 3 cycles, and an integer DIVIDE takes as much as 47 clock cycles. Thus, with the Pentium-ITT processor, the cycle count would be 19N+ 47. For a typical case of a 3×3 (pixel matrix) neighborhood support, N is equal to 8, so that the single division operation takes about 24 percent of the cycles needed for the entire calculation. This relative percentage may vary when other processors are used, but in any case the single division operation takes a considerable fraction of the entire calculation. It is thus desirable to eliminate this single DIVIDE operation.

Therefore, what is needed is a method by which a computer or other digital processor may implement a bilateral filter without performing any division operations.

BRIEF SUMMARY

A method is disclosed for processing an image using a bilateral filter. The bilateral filter is reformulated at each pixel location in the image into a sum of the original signal value of a central pixel at said pixel location and a bilateral correction term which is a function of local signal differences between the central pixel and its neighbors.

In one embodiment, each pixel in the image is processed by buffering a neighborhood of said pixels as determined by the size of the bilateral filter convolution kernel, and a filtered value for each pixel is calculated using a bilateral filter including a normalization expression implemented as a Taylor series expansion.

DETAILED DESCRIPTION

The present method eliminates the need for a division operation in the implementation of a bilateral filter. This division elimination speeds up software implementations and simplifies hardware implementations. A series expansion approximation is implemented using a formula for the normalization of filter weights. The formula employs multiplication and bit-shift operations instead of a division operation. The method provides for a well-controlled trade-off between computational complexity and accuracy of the approximation. The approximation used by the present method is based on a Taylor expansion of the normalization expression.

In order to reduce the potential normalization error, the bilateral filter is first reformulated at each pixel location into a sum of the original signal value at the pixel and a 'bilateral correction term which depends only on local signal differences between the pixel and its neighbors, and is independent of the absolute intensity of the pixel. Hence, the reformulated bilateral filter is expressed in terms of the relative signal intensities of the pixel's neighbors, rather than absolute signal intensities. The normalization expression in the equation is then approximated by a Taylor series expansion, the calculation of which does not require any division operations. The order of Taylor expansion needed to provide the accuracy required for a given application is then determined. Finally, the requisite Taylor expansion thus determined is implemented via an algorithm chosen according to the approximation necessary to achieve the required accuracy, with consideration given to trade-offs between accuracy and computational complexity.

An additional potential benefit of the present method is realized with dedicated hardware implementations, since the method eliminates the need to include a DIVIDE circuit altogether.

Figure 1:
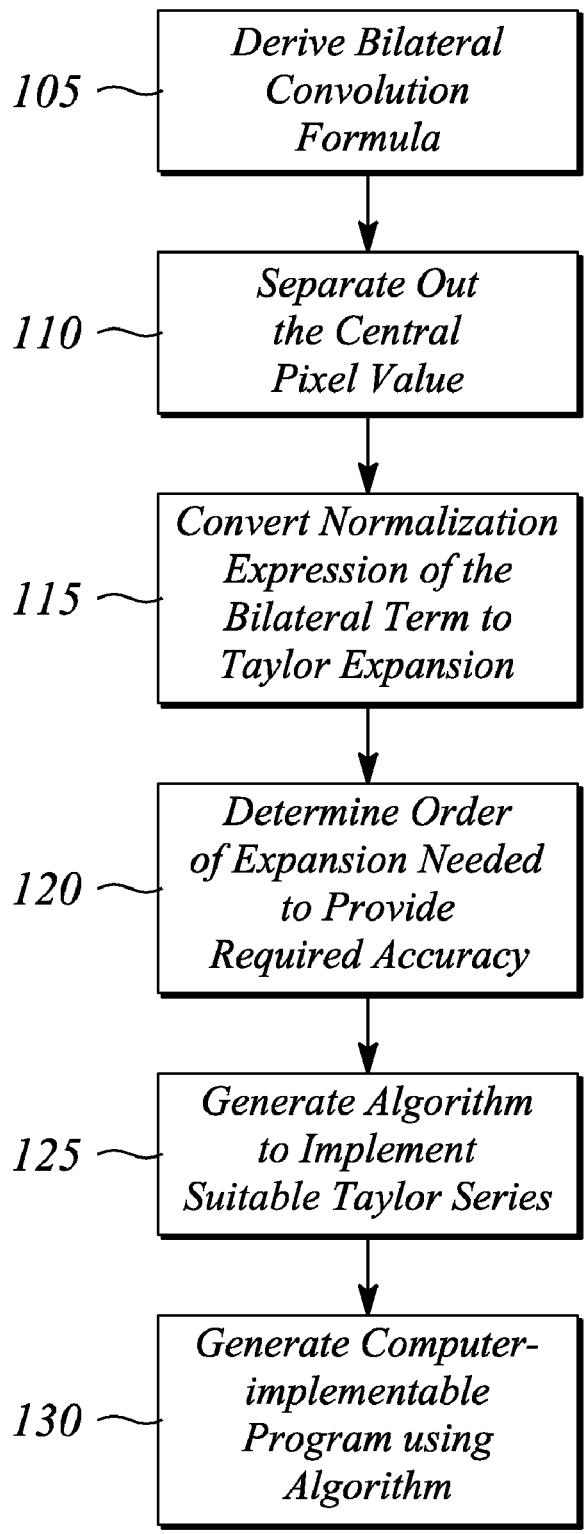
FIG. 1 is a flowchart illustrating basic steps employed in deriving and employing the algorithms underlying the present method.
Figure 2:
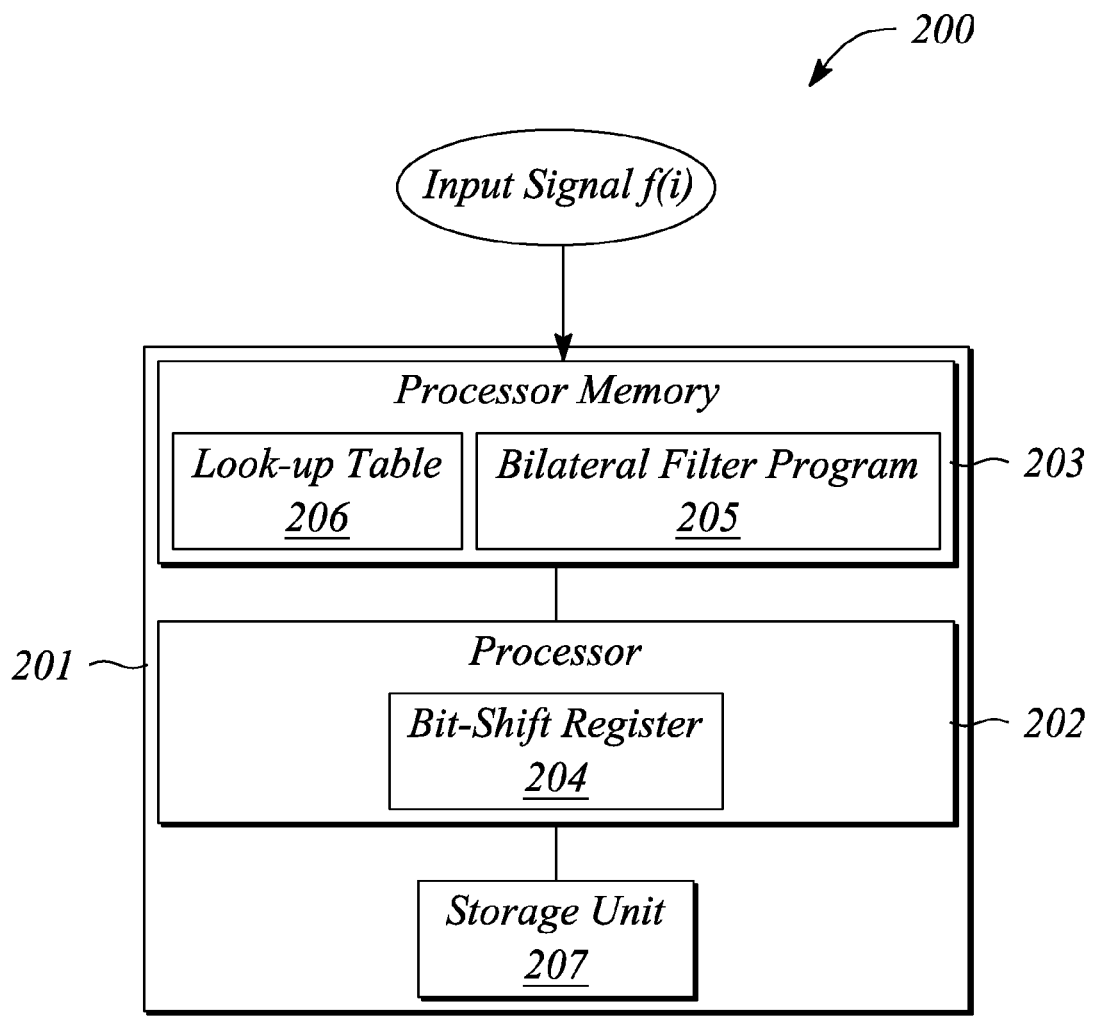
FIG. 2 is a diagram showing an exemplary embodiment of the present system.

FIG. 1 is a flowchart illustrating the basic steps employed in deriving and employing the algorithms underlying the present method. FIG. 2 is a diagram showing certain components of an exemplary embodiment of the present bilateral filter system 200 as on a computer system 201. As shown in FIG. 2, computer system 201 includes a processor 202 with processor memory 203, which contains an executable version of bilateral filter program 205 and an optional look-up table 206, as described herein. Processor 202 includes an integer register 204 for performing bit-shift operations in bilateral filter program 205. An optional storage unit 207, such as a disk storage device may be used to store the bilaterally filtered input signal $f(i)$ after processing.

As shown in FIG. 1, at step 105, the bilateral convolution formula is derived as shown below, starting with the linear convolution formula of Equation 1. The formulation for a bilateral filter as described herein is applicable to discrete signals. For simplicity, the notations shown in this document are one-dimensional; however, they generalize in a straightforward manner to multidimensional signals such as 2D images. An exemplary background for the application of a filter (bilateral or otherwise) to an image is a window of some finite size and shape—the 'support'—that is scanned across an image. The output pixel value is the weighted sum of the input pixels within the window where the weights are the values of the filter assigned to every pixel of the window itself. The window with its weights is called the 'convolution kernel'.

Consider a linear convolution, where $f(i)$ is a single channel input, $y(i)$ the single channel output, and $K(j)$ the convolution kernel. The linear convolution formula is shown by Equation 1:

$$y(i) = \Sigma_j f(i-j) \cdot K(j) \quad (1)$$

where each point i−j is a neighbor of the point i which belongs to the support of the kernel, and the kernel is assumed to be normalized; i.e., $\Sigma_j K(i)=1$. A normalized kernel is required to ensure that the local average (DC level) of the output signal matches the local average of the input signal.

The bilateral convolution formula (Equation 2, below) is derived from the linear convolution formula by multiplying each kernel coefficient $K(j)$ by a signal-dependent 'photometric weight' $g(f(i-j)-f(i))$ which depends on the difference between the signal $f(i)$ at the point (or pixel) under consideration and the signal $f(i-j)$ at the neighboring point (or pixel) corresponding to $K(j)$. Since each convolution weight is multiplied by a different factor, the sum of the modified weight is no longer 1, and the weights have to be re-normalized by the sum of the modified weights, or the signal average will increase. The resulting bilateral convolution formula is shown by Equation 2:

$$y(i) = \frac{1}{\sum_j g(f(i)-f(i-j))\cdot K(j)} \sum_j f(i-j)\cdot g(f(i-j)-f(i))\cdot K(j) \quad (2)$$

The effect of the bilateral filter in Equation 2 near image-edges is smoothing parallel to image edges while sharpening perpendicular to the edges. The photometric weight $g(f(i-j)-f(i))$ in Equation 2 is typically designed to be close to 1 when the difference $\Delta f=(f(i-j)-f(i))$ is small relative to some signal scale S (a typical scale for signal-level differences), and much smaller than 1 when that difference is large relative to S. A typical metric used in some applications is, for example, the Gaussian metric shown by Equation 3:

$$g(\Delta f) = \exp\left\{-\frac{1}{2}\left(\frac{\Delta f}{S}\right)^2\right\} \quad (3)$$

If the values of the signal $f$ are quantized, then the function for the signal-dependent photometric weight $g(f(i-j)-f(i))$ can be pre-calculated for all possible values of $\Delta f$ and stored in lookup table 206 to speed-up the bilateral filter calculation.

A possible generalization of Equation 2 is the cross-channel (multi-channel) case, where the channel c is filtered by the signal differences of another channel $f$ as shown by Equation 4:

$$y(i) = \frac{1}{\sum_j g(f(i-j)-f(i))\cdot K(j)} \sum_j c(i-j)\cdot g(f(i-j)-f(i))\cdot K(j) \quad (4)$$

The bilateral filtering algorithms corresponding to Equation 2 or Equation 4 can be implemented on a computer in floating point arithmetic as shown in the pseudo-coded algorithm 4a below. It is possible to replace floating point arithmetic with integer arithmetic (as shown in algorithm 4b below) by multiplying each of the weights $K_j$, $g_j$ by a power of 2 and rounding to nearest integer as shown in Equation pair 5:

$$K^*_j = [2^{M_K} K_j]$$

$$g^*(\Delta f) = [2^{M_g} g(\Delta f)] \quad (5)$$

where the symbol [ ] denotes rounding to nearest integer. Also, in order to be compliant with the original normalization constraint $K_0 + \Sigma K_j = 1$, despite the quantization errors in $K^*_j$, $K^*_0$ is redefined by the other rounded $K^*_j$ and the normalization constraint:

$$K_0^* = 2^{M_K} - \sum_{j=1}^{N} K_j^* \Leftrightarrow 2^{-M_K}\left(K_0^* + \sum_{j=1}^{N} K_j^*\right) = 1, \quad (6)$$

The bit shifts $M_K$, $M_g$ in Equation pair 5 are determined based on truncation error considerations, and number of available bits in the integer registers of processor 202. 'Bit-shift register' 204 is shown in FIG. 2 as representative of any integer (or other) register in processor 202 that can perform bit-shift operations. As a typical example, suppose that processor 202 uses 32 bit integers. Triple products corresponding to the numerator of Equations 2 and 4 must be accommodated in 32 bits. The signal c or $f$ is typically represented by 8 bits, which leaves 23-24 bits for the sum of products $K^*_j \cdot g^*$ which can have values between 0 and $2^{(M_k+M_g)}$. Thus, $M_K+M_g<24$. Note that the extra factor $2^{(M_k+M_g)}$ in the numerator denominator cancels out. The considerations for selecting the bit-depth of the spatial kernel $M_k$ are derived from the accuracy required to describe the smallest weights in the kernel which are not truncated to zero, and by the constrained finite window size. Frequently $M_k$ is tuned by ad-hoc rules (e.g., making sure that the ratio between the two smallest quantized weights has relative error less than 50%). As a rule of thumb, the larger the kernel size, the larger $M_k$. The present method assumes that $M_k$ is pre-determined. In most practical situations, $M_k$ does not exceed 10.

---

(4a) Bilateral Filter: 'Floating Point' Arithmetic

```
// Lookup table for photometric weights
for d = −255 to 255, G[d] = g(d);
// Apply filter to all image pixels
for i = all image pixels {
    y[i] = norm = 0;
    for j = "neighbors of pixel i" {
        weight = K[j] * G[ f[i − j] − f[i] ];
        norm += weight;
        y[i] += c[i − j]*weight;
    }
    y[i] /= norm;
}
```

(4b) Bilateral Filter: 'Integer' Arithmetic

```
Mk=Mg= 10;
// Lookup table for photometric weights multiplied by a factor
for d = -255 to 255, G[d] = round(g(d)*(1 << Mg));
// pre-calculate convolution weights multiplied by a factor
for j = "neighborhood locations", K[j] = round(K[j]*(1 << Mk));
// Apply filter to all image pixels
for i = all image pixels {
    // Same as in floating point arithmetic (in Equation 4a)
    y[i] = norm = 0;
    ...
    y[i] /= norm;
}
```

The computational complexity of the integer and floating point implementations above is comparable, but since image data is usually stored and saved in integer representation, the integer implementation is considerably faster if the needed conversion from integer to floating point and back to integer is taken into account. Therefore, an integer implementation is preferred for most applications. The computational complexity also depends on the size of the convolution kernel. For example, assume that the support of the kernel contains N+1 grid points. Taking into account that the grid point (i) is trivial to calculate (g(0)=1), the operation count per pixel is: 2N MULTIPLY operations, 3N ADD/SUBTRACT operations, 2N look-up table operations, and a single DIVIDE operation.

As a typical example, one benchmark program showed that on a Pentium-ITT processor, integer ADD or SUBTRACT operations take a single clock cycle, while an integer MULTIPLY takes 5 cycles, a lookup-table operation takes 3 cycles, and an integer DIVIDE takes as much as 47 clock cycles. Thus, with the Pentium-ITT processor, the cycle count would be 19N+47. For a typical case of a 3×3 (pixel matrix) neighborhood support, N is equal to 8, so that the single division operation takes about 24 percent of the cycles needed for the entire calculation. Thus it can be seen that the single division operation takes a considerable fraction of the entire calculation. The present method, described in detail below, eliminates this division operation.

It is desirable to approximate the division operation in a manner such that the result is visually indistinguishable from that of an 'exact' bilateral filter. Inaccuracy in the normalization may change the global average of the signal, producing a visible effect.

To reduce the potential normalization error, at step 110 (in FIG. 1), the bilateral filter is first reformulated at each pixel location into a sum of the original signal value at that 'central' pixel and a 'bilateral correction term' which is a function of local signal differences between the central pixel and its neighbors, and which is independent of the absolute intensity of the central pixel:

(7a) Signal-Differential Single-Channel Bilateral Filter $$y(i) = f(i) + \frac{1}{\sum_j g(f(i-j) - f(i)) \cdot K(j)} \sum_j (f(i-j) - f(i)) \cdot g(f(i-j) - f(i)) \cdot K(j)$$

(7b) Signal-Differential Cross-Channel Bilateral Filter $$y(i) = c(i) + \frac{1}{\sum_j g(f(i-j) - f(i)) \cdot K(j)} \sum_j (c(i-j) - c(i)) \cdot g(f(i-j) - f(i)) \cdot K(j)$$

The formula in Equation 7a resembles the formula for a single iteration of the well-known anisotropic diffusion scheme for a 3×3 neighborhood, shown in Equation 8:

$$y(i) = f(i) + (\Delta t) \Sigma (f(i-j) - f(i)) \cdot g(f(i-j) - f(i)) \cdot K(j) \quad (8)$$

where $$\Delta t = [\Sigma_j g(f(i-j) - f(i)) \cdot K(j)]^{-1} \quad (8a)$$

Equation 7a differs from the anisotropic diffusion formulation (Equation 8), in that it is also applicable for neighborhoods larger than and that the time step $\Delta t$ is not uniform throughout the image, but rather equal to the local normalization factor. The role of can be understood with reference to anisotropic diffusion theory: if the influence function $\psi(t) = t \cdot g(t)$ is re-descending (i.e., ascending for $|t| < T$, and descending for $|t| > T$ where T is an arbitrary threshold), then each iteration will decrease local differences smaller than T, and enhance local difference larger than T, where the smoothing/enhancement effect is proportional to $\Delta t$. This process results in smoothing along the edges, and sharpening across (perpendicular to) the edge. The Gaussian choice for g(•) in Equation 3, is in fact, re-descending.

An analysis of the expression for (Equation 8a) shows that in low-activity regions of the image $\Delta t \approx 1$ while near salient edges, $\Delta t$ can approach $1/K_i$ where $K_i$ is the central kernel coefficient, where K(j) is shortened to $K_j$. Typically, for 3×3 kernels, $1/K_i$ is much larger than one and so is $\Delta t$. Thus the effect of the normalization factor of the bilateral filter primarily affects image edges, and is equivalent to locally speeding up the diffusion process, thus achieving better edge enhancement than anisotropic diffusion in a single iteration. This better edge enhancement is achieved at extra computational cost relative to anisotropic diffusion. The division-free approximation to the bilateral filter, as described herein, retains most of the 'time-step increase' effect near edges without the need for a divide operation.

Before determining a specific formulation for the present approximation method, the tolerable deviation from an 'exact' bilateral filter is first estimated. Typically, intensity data are quantized to 256 gray-levels (8-bits), so there is no need for better accuracy than half gray-level. Moreover, due to the 'visual masking effect' of the human visual system, the sensitivity to gray level deviations is much reduced near abrupt jumps (i.e., image edges). Thus, a deviation of a few gray-levels at edges is visually unobservable.

Experimentation with real images showed that a deviation of 3 to 4 gray-levels at edges between text features and background is still unperceivable by the human eye. However, in an application where the bilateral filter is applied recursively several times, the approximation error at image edges accumulates, and the approximation error may need to be limited to less than half gray-level per filter application, in order to obtain visual results equivalent to those obtained by several applications of an 'exact' bilateral filter.

Figure 3A:
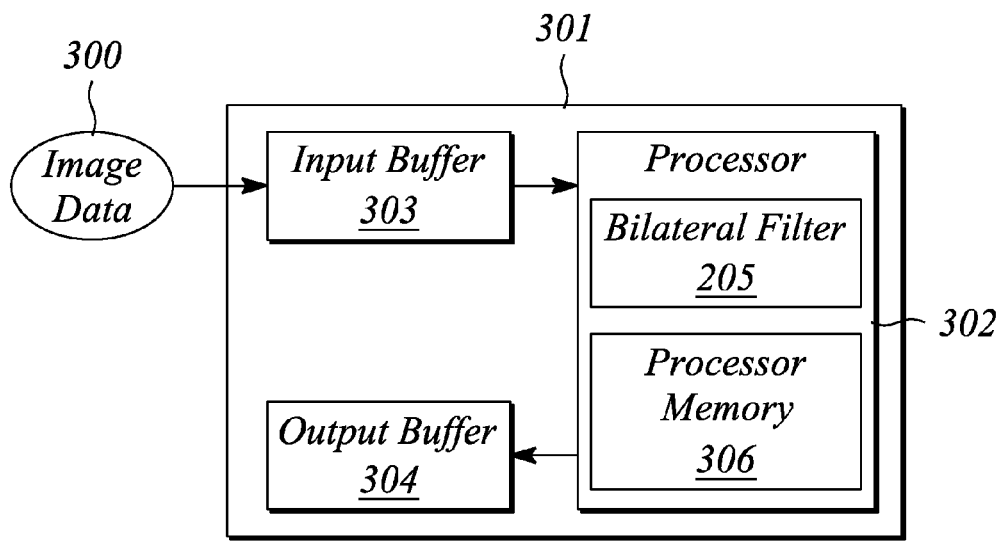
FIG. 3A is a diagram showing exemplary components of a hardware-based implementation of the bilateral filter of FIG. 1.
Figure 3B:
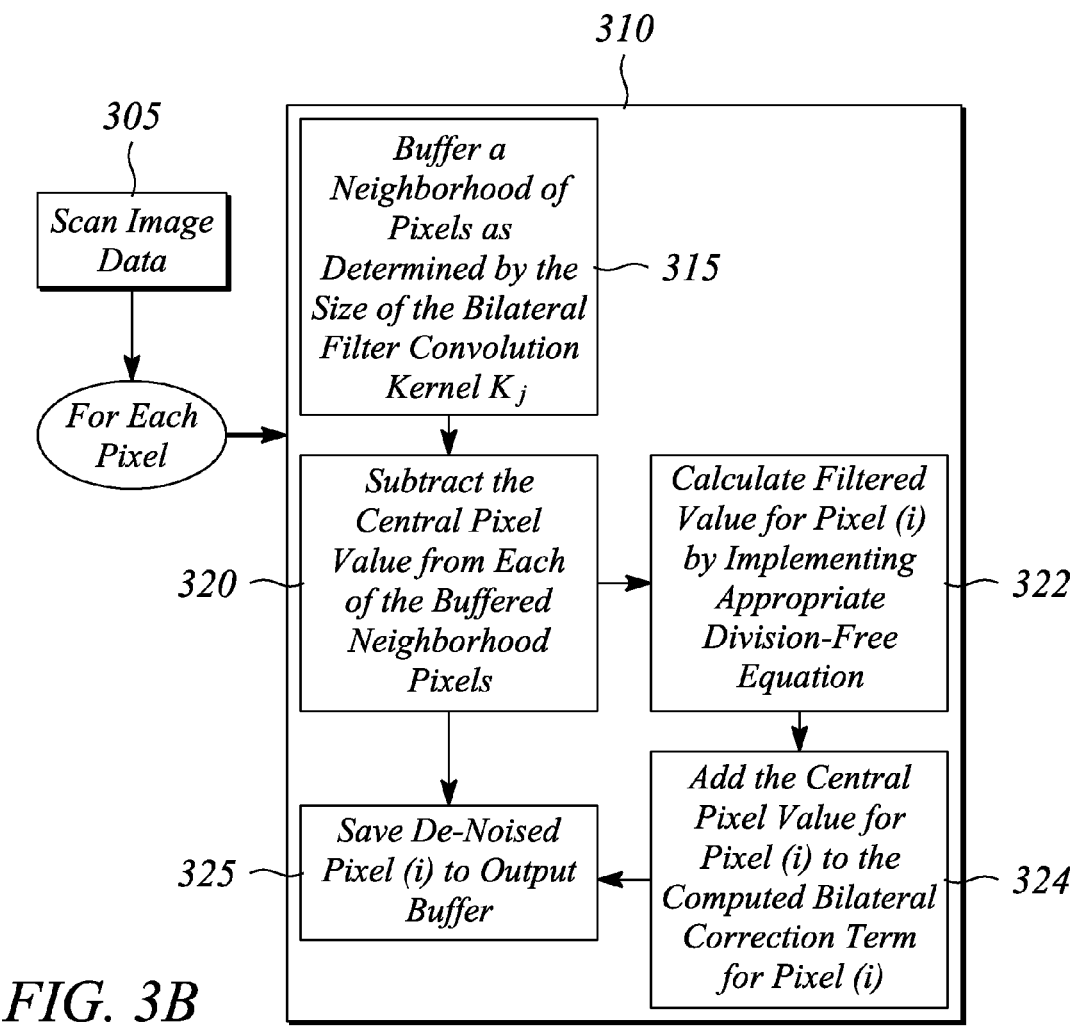
FIG. 3B is a diagram showing exemplary steps performed in a hardware implementation of the bilateral filter of FIG. 1.

FIG. 3A is a diagram showing exemplary components of a hardware-based implementation of the bilateral filter of FIG. 1. FIG. 3B is a diagram showing exemplary steps performed using the hardware implementation shown in FIG. 3A. As shown in FIGS. 3A and 3B, at step 305, image data 300 is scanned into input buffer 303 in raster scan mode, in an exemplary embodiment. For each pixel P(i) in buffer 303, the operations shown in block 310 are performed by processor 302 implementing bilateral filter 205 as follows.

At step 315, a neighborhood of pixels buffered in processor memory 306 as determined by the size of the bilateral filter convolution kernel $K_j$. The indexing notation $K_j$ is used instead of $K_{ij}$, since the present method functions for a bilateral filter in any number of dimensions, including time-series (1D), images (2D), volumetric images (3D), or higher-dimensional data. Hence the neighbor-index j can be thought of in general as a vectorial index having number of scalar indices as the number of dimensions of the data (where two indices are used for image data).

At step 320, the central pixel value is subtracted from each of the buffered neighborhood pixels. At step 322, the filtered value for each pixel (i) is calculated using a hardware or firmware circuit implementing one of the division-free bilateral filter Equations 15-23, described below. The central pixel value for pixel (i) is then added to the computed bilateral correction term for pixel (i), at step 324. At step 325, the de-noised pixel (i) is saved in output buffer 304.

The present method includes a family of approximations to Equations 7a and 7b with different trade-offs between accuracy and complexity. In particular, two particularly useful points are identified on this trade-off curve—one approximation which will not deviate more than 4 gray-levels at strong edges, and not more than 0.5 gray-levels at flat regions; and a second approximation which will not deviate more than 0.5 gray-levels for all pixels.

The present approximation method is based on Taylor expansion of the normalization expression. A simplified notation is used in the following equations, based on the fact that the indexing of neighboring pixels is relative to the center pixel i, which is the pixel being processed. The function $f(i)$ is replaced with $f_0$, and $f(i-j)$ is replaced with $f_j$. The difference $f_j - f_0$ is denoted by $\Delta f$ and $g(f(i)-f(i-j))$ is denoted by $g(\Delta f_j)$, or in short, $g_j$. In addition, K(j) is shortened to $K_j$.

The normalization expression is then given by Equation 9:

$$[\Sigma g_j K_j]^{-1} = [\Sigma g_j K_j + (1-\Sigma K_j)]^{-1} = [1 - \Sigma K_j(1-g_j)]^{-1} \quad (9)$$

In flat portions of the signal or image, the photometric weights g will be close to 1, so that 1−g will approach zero, yielding $1-\Sigma K_j(1-g_j) \ll 1$. This "smallness" parameter is denoted by $\alpha$:

$$\alpha = \Sigma K_j(1-g_j) \quad (10)$$

Since the factors $(1-g_j)$ are all positive and smaller than 1, $\alpha$ is guaranteed to lie between 0 and 1. In flat regions, $\alpha$ is close to zero, and increases to values closer to 1 in highly active neighborhoods, such as neighborhoods containing edges or texture. In simulations performed on actual scanned images, and with the Gaussian photometric weight function (as shown in Equation 3), $\alpha$ reaches values of ~0.5 near strong features. Denoting the numerator of Equation 7a by $\Delta$, Equation 7a can be rewritten as:

$$y(i) = f(i) + \frac{\Delta}{1-\alpha} \quad (11)$$

where $\Delta = \Sigma(f(i-j)-f(i))g(f(i-j)-f(i))\cdot K(j)$;

thus, $\Delta = \Sigma \Delta f_j \cdot g_j \cdot K_j$.

Similarly, denoting the numerator of Equation 7b by $\Delta$ Equation 7b can be rewritten as:

$$y(i) = c(i) + \frac{\Delta}{1-\alpha} \quad (12)$$

where $\Delta = \Sigma(c(i-j)-c(i))\cdot g(f(i-j)-f(i))\cdot K(j)$;

thus, $\Delta = \Delta c_j \cdot g_j \cdot K_j$.

At step 115 (in FIG. 1), the expression $\Delta/(1-\alpha)$ in Equations 11 and 12 is approximated by expanding the factor $1-\alpha$ in the normalization expression as an infinite geometric sum formula, or equivalently by Taylor expansion:

$$\Delta \cdot (1-\alpha)^{-1} = \Delta \cdot (1 + \alpha + \alpha^2 + \alpha^3 + \cdots) = \Delta \cdot \left(\sum_{n=0}^{\infty} \alpha^n\right) \quad (13)$$

The error due to neglecting series terms beyond n is:

$$\Delta S_n = S_\infty - S_n = \Delta \cdot \frac{\alpha^{N+1}}{1-\alpha} = \alpha^{N+1} \cdot \left(\frac{\Delta}{1-\alpha}\right) \quad (14)$$

Therefore, it can be seen that the relative error in calculating the quotient $\Delta/(1-\alpha)$ is $\alpha^{n+1}$. In flat regions, where $\alpha \ll 1$ the relative error is very small even in the zero-order approximation. In addition, in flat regions the value of the numerator, $\Delta$, is typically only few gray-levels. Hence, the absolute error for pixels in flat regions is well below 0.5 gray-levels, regardless of approximation order n. However, near edges, $\alpha$ can reach values of ~0.5, as indicated above. The zero order approximation (n=0) thus achieves (1−0.5) of the effect of an 'exact' bilateral filter at edges, the first order approximation (n=1) achieves ~75% (1−0.5²) of the effect of the exact bilateral filter at edges, and so forth.

The absolute approximation error is proportional to the term to be estimated, $\Delta/(1-\alpha)$. At image edges, this term reaches values of the order of $\sigma$ which determines the metric in Equation 3. Typically, the order of $\sigma$ and therefore of $\Delta/(1-\alpha)$ is several tens of gray-levels. Thus, an approximation error of 3-4 gray-levels corresponds to 6-12% relative error. This level of accuracy is achieved by truncating the infinite-series and keeping only terms up to n=2 or 3 ($0.5^3 \sim 0.12$, $0.5^4 \sim 0.06$).

In the same manner, an approximation error of gray-levels at edges corresponds to ~1% relative error. This level of accuracy is achieved by keeping terms up to n=6 or 7. Simulations on actual scanned images using various values for $\sigma$, and various orders n, show that low-order estimations are quite accurate. The maximal approximation error is summarized in Table 1:

TABLE 1

| number of terms (1 + $n_{max}$) | Max. absolute error (gray levels) |
|---|---|
| 1 | 8-10 |
| 2 | 3-4 |
| 3 | 2-2.5 |
| 4 | 1-1.5 |
| 8 | 0.5-1 |

According to the above table, approximations with orders from $n_{max}=0$ to $n_{max}=7$ may provide sufficient accuracy, depending on the particular application. In particular, the two useful trade-off points mentioned above are identified in the table. For a single-iteration application, where absolute error at edges is to be limited to 3-4 gray-levels, one can use the first order approximation, $n_{max}=1$ (Alternatively, the zero-order approximation $n_{max}=0$, could be used for faster computation, if accuracy is not a primary consideration). For a multiple-iteration application, where the maximum absolute error should be kept around 0.5, in order not to accumulate errors in subsequent iterations, a $7^{th}$-order approximation ($n_{max}=7$) can be used. As indicated by step 120 in FIG. 1, the order of expansion needed to provide the accuracy required for a given application is determined using the process described above.

Exemplary algorithms for approximations of various orders are shown below. The trade-off between computational complexity and approximation accuracy for the single-channel and multi-channel cases is summarized in Table 2, further below.

In step 125 in FIG. 1, an algorithm is generated to implement a Taylor series having an accuracy suitable for a given application, as described below. Finally, at step 130, computer program 205 is generated to implement a bilateral filter of desired accuracy, using a programming language suitable for the particular processor 201 that will employ the filter.

Zero Order Approximation (n=0)

In the zero-order approximation to Equations 7a and 7b, the normalization factor is approximated as 1, as shown in Equations 15a and 15b (single channel and multi-channel signals), respectively:

$$y^{[0]}(i)=f(i)+\Sigma(f(i-j)-f(i)\cdot g(f(i-j)-f(i))\cdot K(j) \quad (15a)$$

$$y^{[0]}(i)=c(i)+\Sigma(c(i-j)-c(i)\cdot g(f(i-j)-f(i))\cdot K(j) \quad (15b)$$

In the particular case of a 3×3 pixel neighborhood, Equation 15a corresponds to a single iteration of anisotropic diffusion (see Equation 6), with a uniform time-step, $\Delta t=1$. However, unlike the anisotropic diffusion case, Equations 15a and 15b are applicable to other sizes of neighborhoods as well.

The computational complexity may be reduced for the zero order approximation. In the particular case of a signal channel, Equation 15a can be computed even faster if it is reformulated as:

$$y^{[0]}(i)=f_0+\Sigma\psi(\Delta f_j)\cdot K_j \text{ where } \psi(t)=g(t) \quad (16)$$

and the influence function $\psi(t)$ is pre-calculated as a lookup table having the same values as those in previously-described look-up table 206, where each value is multiplied by t. This reduces N multiplications or 5*N cycles from the calculation, yielding 10*N cycles. Equation 16 does not apply to the multi-channel case (Equation 15b). Exemplary pseudo-code for implementing an exemplary single channel zero-order algorithm is shown in algorithm 16a:

---

(16a) Zero-order: Single channel

```
for d = -255 to 255
    // pre-calculate look-up table for influence function PSI(d)
    PSI[d] = d*g(d);    // where d = possible values of (f(i - j) - f(i)),
                        // and g( ) is the photometric function
for i = all image pixels {
    y0[i] = f[i];
    for j = 'neighbors of pixel i' {
        y0[i] += K[j] * PSI[f[i - j] - f[i] ];
}
```

---

Exemplary pseudo-code for implementing an multi-channel zero-order algorithm is shown in algorithm 16b:

---

(16b) Zero-order: Multi-channel

```
for d = -255 to 255
    // pre-calculate table for edge-stopping function
    G[d] = g(d); // where d = possible values of (f(i - j) - f(i)), and
                 // and g( ) is the photometric function
for i = all image pixels {
    y0[i] = c[i];
    for j = 'neighbors of pixel i' {
        y0[i] += K[j] * (c[i - j] - c[j]) * G[f[i - j] - f[i] ];
}
```

---

First Order Approximation (n=1)

A better approximation to the normalization factor is obtained by keeping the first two terms in the Taylor expansion:

$$[1-\Sigma K_j(1-g_j)]^{-1}\approx 1+\Sigma K_j(1-g_j)=2-\Sigma K_j g_j \quad (17)$$

Thus, the first-order approximation to Equations 7a and 7b is shown by Equations 18a and 18b, respectively:

$$y^{[1]}(i)=f(i)+[2-\Sigma K_j g_j]\cdot\Sigma(f(i-j)-f(i))\cdot g(f(i-j)-f(i))\cdot K(j) \quad (18a)$$

$$y^{[1]}(i)=f(i)+[2-\Sigma K_j g_j]\cdot\Sigma(f(i-j)-f(i))\cdot g(f(i-j)-f(i))\cdot K(j) \quad (18b)$$

The first-order approximation is implemented in a straight-forward fashion. Instead of accumulating the sum of weights $K_j g_j$ as in the 'exact' bilateral filter, the accumulator is initialized to 2.0, and $K_j g_j$ is subtracted for each neighbors to obtain the normalizing factor $2-K_j g_j$. Note that the need to explicitly calculate $K_j g_j$ for each neighbor eliminates the advantage in pre-calculating $\psi(\bullet)$ as in Equation 16. Thus, the algorithms for the single-channel and multi-channel cases are essentially identical.

In order to implement Equation 18a in integer arithmetic, each of the weights $K_j$, $g_j$ is multiplied by a power of 2 (e.g., $2^6$) and rounded to nearest integer (pre-calculated once). Then, multiply the bilateral sum by $2*2^{12}-\Sigma K_j g_j$, and do a right bit-shift (by 24 bits, since there are four factors of 26 to compensate for). With 32-bit integers, this leaves 8 bits of accuracy to the resulting correction, which is more than sufficient. In summary, the division operation is replaced by an integer multiplication and a bit-shift operation. Exemplary pseudo-code for implementing a single-channel/multi-channel first-order algorithm is shown below in algorithm 18c:

---

(18c) First-order Approximation

```
BITS = 6;   // a higher number of BITS could be used when integers
            // are represented by 64 bits instead of 32 bits
for d = -255 to 255
    G[d] = round(g(d)*(1 << BITS));
for j = 'neighboring locations', K[j] = round(K[j]*(1 << BITS));
for i = all image pixels {
    sum = 0;     norm = 2 << (2*BITS);
    for j = 'neighbors of pixel i' {
        weight = K[j] * G[f[i - j] - f[i] ];
        sum += weight * (c[i - j] - c[j]);
        norm -= weight;
}
```

Higher Order Approximation (n>1)

The power series in Equation 13 can be calculated by the well-known polynomial calculation formula in Equation 19:

$$1+\alpha+\alpha^2+\alpha^3+\ldots = (1+\alpha\cdot(1+\alpha\cdot)) \quad (19)$$

The implementation of Equation 19 in floating arithmetic is straightforward. However, the integer arithmetic implementation has to overcome the limitation of 32-bit integers on most standard processors.

An exemplary algorithm (20) for a single-channel/multi-channel high-order approximation appears below. The approximation order is denoted therein by n_max. For each factor of $1+\alpha$, division is accomplished by bit-shifting (via register 204 [FIG. 1]. for example) to avoid integer overflow, as shown in algorithm 20. The integer operation count for the part of the process that replaces the division operation is $n_{max}$ MULTIPLY, $n_{max}+1$ ADD, and $n_{max}+1$ BITSHIFT operations.

On Pentium-ITT processors, for example, the cycle count is $7*n_{max}+2$ not including the overhead for looping. By in-lining the loop "for n=1 to n_max", this overhead is eliminated. Joining the two last BITSHIFT operations into a single operation reduces the cycle count to $7*n_{max}+1$. This method of calculation is faster than the exact method that uses division (requiring 47 cycles) up to $n_{max}=6$ (requiring 43 cycles for the present method).

---

(20) Higher-order Approximation : Power Series

```
BITS = 6;
for d = -255 to 255 , G[d] = round(g(d)*(1 << BITS));
for j = 'neighboring locations', K[j] = round(K[j]*(1 << BITS));
for i = all image pixels {
    D = 0;
    a = 1 << (2*BITS);
    for j = 'neighbors of pixel i' {
        weight = K[j] * G[f[i – j] – f[i] ];
        D += weight * (c[i – j] – c[j]);
        a – = weight;
    }
    y_n[i] = D;
    for n = 1 to n_max {
        y_n[i] = y_n[i]*a + D;
        y_n[i] >>= (2*BITS);
    }
    y_n[i] >>= (2*BITS);
    y_n[i] += c[i];
}
```

---

In an alternative embodiment, an infinite product calculation method is suitable for very high-order approximations. Note that the infinite sum on the left hand side in Equation 19 can be expressed as an infinite product (Equations 21/22), which converges much faster than the sum for high-orders.

$$1+\alpha+\alpha^2+\alpha^3+\alpha^4+\alpha^5+\alpha^6\alpha^7+\ldots = (1+\alpha)\cdot(1+\alpha^2)\cdot(1+\alpha^4) \quad (21)$$

Thus:

$$\sum_{n=0}^{2^{M}-1} \alpha^n = \prod_{m=0}^{M-1} \left(1 + \alpha^{(2^m)}\right) \quad (22)$$

The approximation error of a product series (e.g., the product series shown in Equation 21) is given according to Equation 14 as:

$$\Delta S_{M-1} = S_\infty - S_{2^M-1} = \alpha^{(2^M-1)} S_\infty \quad (23)$$

Thus, the relative error of neglecting higher orders than M in the product series is $\alpha^{(2^M-1)}$. According to equation 23, a power series truncated to $2^M$ terms can be replaced by a mathematically equivalent expression which is a product of M terms (i.e., a truncated product series). This product series expression can be computed more efficiently than the equivalent power series. Thus, for approximation orders $n_{max}=2^{M-1}$ (i.e., $n_{max}=3, 7, 15$, etc), the 'product-series' algorithm (24) described below can be used as a more efficient alternative to the 'power-series' algorithm (20) presented above.

The integer arithmetic implementation has to accommodate the limitation of 32-bit integers on most standard processors. Therefore, for each factor of$(1+\alpha^k)$, division by bit-shifting is performed to avoid integer overflow. The resulting algorithm (24) for a single-channel/multi-channel high-order approximation appears below.

---

(24) Higher-order Approximation : Product Series

```
BITS = 6;
for d = -255 to 255 , G[d] = round(g(d)*(1 << BITS));
for j = 'neighboring locations', K[j] = round(K[j]*(1 << BITS));
for i = all image pixels {
    sum
        sum += weight * (c[j] – c[j]);
        a –= weight;
    }
    y_M[i] = sum;
    for m = 0 to M {
        y_M[i] = *= (1<<(2*BITS) + a); y_M[i] >>= (2*BITS);
        a *= a; a >>= (2*BITS);
    }
    y_M[i] >>= (1*BITS);
    y_M[i] += c[i];
}
```

---

Each term in the product series requires one addition and two multiplications since ($\alpha^2 = \alpha*\alpha$, $\alpha^4 = \alpha^2*\alpha^2$, etc. The operation count for the part that replaces the division operation is 2M MULTIPLY, M+1 ADD, and 2M+1 BITSHIFT operations where M is the number of terms in the product series (Algorithm 24). As previously indicated, one BITSHIFT operation can be economized by 'in-lining' the code. The corresponding cycle count is 13*M+1. For example, calculating M=3 product terms takes 40 cycles on a Pentium-ITT processor. An equivalent calculation using a power series M (Algorithm 20), with n_max=7 (since $n\_max=2^M-1$), takes 50 cycles. In comparison, the single DIVIDE operation that is being eliminated would take 47 cycles.

Summary of Trade-Offs

Table 2, below, summarizes for each approximation the integer operations count (per pixel), the clock cycle count (per pixel) on the Pentium-III processor, the maximum absolute deviation from the exact bilateral filter ($L_\infty$ error).

For zero-order approximations, algorithm 16b (after Equation 15b) is advantageously used for color images, and grayscale images may be processed using the more efficient algorithm 16a (after Equation 16), where one multiplication operation can be economized into the look-up table.

For order n=1, the first-order algorithm 18c according to Equation 18a (grayscale) or Equation 18b (color) may be used; for order n=2 algorithm 20 'high-order approximation:

power series' (after Equation 19), may be used; for orders n=3, n=7, algorithm 24 'high-order approximation: product series' (after Equation 21), may be advantageously employed.

An error below 3-4 gray-levels is unperceivable at image edges due to the 'visual masking' property of the human visual system, and an error below 0.5 gray-levels does not accumulate in repeated applications of the filter in integer representation.

TABLE 2

Relative Accuracy vs. Approximation Order

| $n_{max}$ | Cycles/pixel Single-channel | Cycles/pixel multi-channel | Max. deviation ($L_\infty$) |
|---|---|---|---|
| 0 | 10N | 16N | 8-10 |
| 1 | 16N + 8 | 17N + 8 | 3-4 |
| 2 | 16N + 15 | 17N + 15 | 2-2.5 |
| 3 | 16N + 23 | 17N + 23 | 1-1.5 |
| 7 | 16N + 41 | 17N + 41 | 0.5-1 |
| exact | 16N + 47 | 16N + 47 | 0 |

While exemplary embodiments of the present system have been shown in the drawings and described above, it will be apparent to one skilled in the art that various embodiments of the system are possible. For example, the specific sequence of steps described above in FIGS. 1 and 3B, as well as the specific algorithms set forth above should not be construed as limited to the specific embodiments described herein. Modification may be made to these and other specific elements of the system without departing from its spirit and scope as expressed in the following claims.

What is claimed is:

1. A method of filtering a digital image of a physical scene using an approximated bilateral filter, the method comprising:
    adding a bilateral correction term to a first value of a signal at a point to produce a filtered signal value, the bilateral correction term being a product of a summation term and an approximation of a normalization factor of an exact bilateral filter, wherein the summation term comprises a summation of products of a convolution kernel coefficient, a photometric weight, and a difference between the first value of the signal and a second value of the signal at a neighboring point, wherein the signal represents the digital image, and wherein adding a bilateral correction term is performed in a bilateral filter system; and
    outputting the filtered signal value representing a filtered digital image, the outputted filtered signal value being one or both of stored in memory and displayed for viewing by a user.

2. The method of claim 1, wherein the signal is filtered using a photometric weight that is a function of a channel other than a channel of the signal, the bilateral filter being employed in cross-channel filtering.

3. The method of claim 1, wherein the normalization factor is approximated as one.

4. The method of claim 1, wherein the normalization factor is represented as a reciprocal of one minus a smallness factor that is a function of signal values of points neighboring the point having the first value, the normalization factor being approximated by a truncated series expansion in the smallness factor.

5. The method of claim 4, wherein the truncated series expansion of the normalization factor is a truncated power series.

6. The method of claim 4, wherein the truncated series expansion of the normalization factor is a truncated product series.

7. The method of claim 1, wherein the method is implemented using integer arithmetic including only addition, subtraction, multiplication and bit-shift operations.

8. A method of filtering an image using an approximated bilateral filter, the bilateral filter having a convolution kernel, the method comprising:
    determining using a bilateral filter system an i-th filtered pixel value y(i) of a filtered image from a value c(i) of an i-th pixel of a first channel of the image according to $$y(i)=c(i)E\cdot\Sigma_j(c(i-j)-c(i))\cdot g(f(i-j)-f(i))\cdot K((j),$$

wherein i and j are integers, E is a series expansion of a normalization factor, $f(i)$ is a value of an i-th pixel of a second channel of the image, c (i−j) is a value of a j-th neighboring pixel of the i-th pixel of the first channel, $f(i-j)$ is a value of a j-th neighboring pixel of the i-th pixel of the second channel, g(•) is a photometric weight determined from a difference of the pixel values $f(i-j)-f(i)$, and K(j) is a j-th coefficient of the convolution kernel corresponding to the j-th neighboring pixel; and
    outputting from the bilateral filter system the filtered image,
    wherein the outputted filtered image is one or more of stored, displayed to a user and further processed.

9. The method of claim 8, wherein the second channel is the first channel such that $f(i)$ is c(i) for all values of i within the image.

10. The method of claim 8, wherein the series expansion of the normalization factor is a power series expansion of a function of a smallness factor α, the smallness factor α being defined by $$\alpha \equiv \Sigma K(j)\cdot(1-g(f(i-j)-f(i))),$$

and the normalization factor being given by $$\frac{1}{1-\alpha},$$

wherein the power series expansion is given in terms of the smallness factor α and an integer index n by $$(1+\alpha+\alpha^2+\alpha^3+\cdots+\alpha^{n_{max}})=\left(\sum_{n=0}^{n_{max}}\alpha^n\right),$$

the power series expansion being truncated at a predetermined non-negative integer $n_{max}$.

11. The method of claim 8, wherein the series expansion of the normalization factor is a product series expansion of a function of a smallness factor α, the smallness factor α being defined by $$\alpha \equiv \Sigma K(j)\cdot(1-g(f(i-j)-f(i))),$$

and the normalization factor being given by $$\frac{1}{1-\alpha},$$

wherein the product series expansion is given in terms of the smallness factor α and an integer index m by $$(1+\alpha)\cdot(1+\alpha^2)\cdot(1+\alpha^4)\cdots(1+\alpha^{2^{M-1}}) = \prod_{m=0}^{M-1}(1+\alpha^{(2^m)}),$$

the product series expansion being truncated at a predetermined non-negative integer M−1.

12. The method of claim 8, wherein the series expansion E of a normalization factor is a zero-th order expansion such that E equals 1.

13. The method of claim 8, wherein the series expansion E of a normalization factor is a first order power series expansion such that E is given by $$E = 2 - \Sigma K(j)\cdot g(f(i-j) - f(i)).$$

14. A method of processing an image using an approximated bilateral filter having a convolution kernel represented by a set of kernel coefficients $K_j$ indexed on an integer j, the method comprising:
- selecting a central pixel of the image having a value $c_i$, an integer i being an integer index identifying the selected central pixel;
- determining a difference $\Delta c_j$ between the value $c_i$ and a value $c_j$ of a j-th neighboring pixel within a support of the convolution kernel;
- determining a photometric weight $g_j$ for all of the index integers j;
- determining a truncated series expansion of a normalization factor, the normalization factor being a function of a smallness factor α;
- determining a summation term Δ that comprises multiplying together corresponding ones of the differences $\Delta c_j$, the photometric weights $g_j$, and the convolution kernel coefficients $K_j$ to obtain multiplicative products; and summing together the multiplicative products for all of the index integers j; and
- producing an output pixel having a value $y_i$ that comprises multiplying the truncated series expansion and the summation term Δ to obtain a product; and adding the product to the central pixel value $c_i$, one or more of selecting, determining a difference, determining a photometric weight, determining a truncated series expansion, determining a summation, and producing an output pixel being performed by a bilateral filter system,
- wherein a succession of produced output pixels for successive selected central pixels are assembled and outputted as a processed image, the processed image being one or both of stored in memory and displayed to a user.

15. The method of claim 14, wherein the truncated series expansion of a normalization factor is a power series expansion, a power series of the expansion having only positive integer n powers of the smallness factor α, the integer n ranging between zero and a predetermined non-negative integer $n_{max}$, the smallness factor α comprising a summation over all of the index integers j of a product of the kernel coefficients $K_j$ and one minus the photometric weight $g_j$.

16. The method of claim 14, wherein the truncated series expansion of a normalization factor is a product series expansion in the smallness factor α, the smallness factor α comprising a summation over all of the index integers j of a product of the kernel coefficients $K_j$ and one minus the photometric weight $g_j$.

17. The method of claim 14, wherein the approximated bilateral filter is employed in cross-channel filtering of the image, the cross-channel filtering having a first channel and a second channel, the first channel comprising the central pixel with the value $c_i$, the second channel comprising a central pixel with a value $f_i$, the method further comprising:
- determining a difference $\Delta f_j$ between the second channel value $\Delta f_i$ and a value $f_i$ of a j-th neighboring pixel of the second channel within a support of the convolution kernel,
- wherein determining the photometric weight $g_j$ employs the difference $\Delta f_j$, the difference $\Delta f_j$ of the second channel.

18. The method of claim 17, wherein the pixels are quantized and represented by a finite number of discrete values, a set of photometric weights g being predetermined for all possible values of the difference $\Delta f_j$, and wherein determining the photometric weight $g_j$ comprises selecting from among the set of predetermined photometric weights g according to determined ones of the difference $\Delta f_j$.

19. The method of claim 14, wherein the approximated bilateral filter is employed in single channel filtering of the image, the pixels being quantized and represented by a finite number of discrete values, and wherein a set Ψ of values is predetermined, the values of the set Ψ representing different products of the photometric weight $g_j$ and the difference $\Delta c_j$ for all possible values of the difference $\Delta c_j$, the photometric weight $g_j$ being a function of the difference $\Delta c_j$, selected ones of the predetermined values of set Ψ being used in determining a summation term Δ.

20. The method of claim 14, the method being implemented using integer arithmetic including only addition, subtraction, multiplication and bit-shift operations.

\* \* \* \* \*

UNITED STATES PATENT AND TRADEMARK OFFICE
CERTIFICATE OF CORRECTION

PATENT NO. : 7,801,386 B2
APPLICATION NO. : 12/021979
DATED : September 21, 2010
INVENTOR(S) : Ron Maurer It is certified that error appears in the above-identified patent and that said Letters Patent is hereby corrected as shown below:

In column 14, line 14, in Claim 8, delete " $y(i)=c(i)E\cdot\Sigma_j(c(i-j)-c(i))\cdot g(f(i-j)-f(i))\cdot K(j),$ " and insert -- $y(i)=c(i)+E\cdot\sum_j(c(i-j)-c(i))\cdot g(f(i-j)-f(i))\cdot K(j),$ --, therefor.

In column 16, line 22, in Claim 17, delete "$\Delta f_i$" and insert -- $f_i$ --, therefor.

In column 16, line 22, in Claim 17, delete "$f_i$" and insert -- $f_j$ --, therefor.

Signed and Sealed this
First Day of March, 2011

David J. Kappos
*Director of the United States Patent and Trademark Office*